(12) United States Patent
Ogihara et al.

(10) Patent No.: US 12,162,198 B2
(45) Date of Patent: Dec. 10, 2024

(54) INJECTOR

(71) Applicant: NISSEI ASB MACHINE CO., LTD., Nagano (JP)

(72) Inventors: Kazuki Ogihara, Nagano (JP); Nobusuke Takahashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 228 days.

(21) Appl. No.: 17/418,140

(22) PCT Filed: Dec. 25, 2019

(86) PCT No.: PCT/JP2019/050936
§ 371 (c)(1),
(2) Date: Jun. 24, 2021

(87) PCT Pub. No.: WO2020/138213
PCT Pub. Date: Jul. 2, 2020

(65) Prior Publication Data
US 2022/0097271 A1 Mar. 31, 2022

(30) Foreign Application Priority Data
Dec. 27, 2018 (JP) .................................. 2018-245947

(51) Int. Cl.
*B29C 45/50* (2006.01)
(52) U.S. Cl.
CPC .................................... *B29C 45/50* (2013.01)
(58) Field of Classification Search
None
See application file for complete search history.

(56) References Cited

U.S. PATENT DOCUMENTS

| | | |
|---|---|---|
| 2002/0071889 A1 | 6/2002 | Koide et al. |
| 2003/0224085 A1 | 12/2003 | Onuma et al. |
| 2004/0156939 A1 | 8/2004 | Ickinger |
| 2005/0233027 A1 | 10/2005 | Yamanaka et al. |
| 2010/0112120 A1 | 5/2010 | Kitta et al. |

(Continued)

FOREIGN PATENT DOCUMENTS

| | | |
|---|---|---|
| CN | 1683142 A | 10/2005 |
| CN | 102107493 A | 6/2011 |

(Continued)

OTHER PUBLICATIONS

Office Action issued in Chinese Patent Application No. 201980092992.6 dated Sep. 19, 2022, along with English translation thereof.

(Continued)

*Primary Examiner* — Armand Melendez
(74) *Attorney, Agent, or Firm* — Greenblum & Bernstein, P.L.C.

(57) ABSTRACT

In a configuration in which a guide member that guides an intermediate member to be slidably movable is provided on an upper surface of side support plates, a bending buffer portion is provided in a first region of the side support plates which is located more outward than a part of the side support plates on which the guide member is provided. The bending buffer portion is configured to be bent and deformed easier than a second region of the side support plates in which the guide member is provided.

2 Claims, 7 Drawing Sheets

(56) References Cited

U.S. PATENT DOCUMENTS

2011/0142982 A1    6/2011  Kitta et al.
2015/0343685 A1   12/2015  Yano

FOREIGN PATENT DOCUMENTS

| CN | 105313284 A | | 2/2016 | |
|---|---|---|---|---|
| EP | 1 586 432 A1 | | 10/2005 | |
| JP | 2000-006206 A | | 1/2000 | |
| JP | 2001-248706 A | | 9/2001 | |
| JP | 2004-358981 A | | 12/2004 | |
| JP | 2006199004 A | * | 8/2006 | |
| JP | 2008-030267 A | | 2/2008 | |
| JP | 2008-044109 A | | 2/2008 | |
| JP | 2008-080640 A | | 4/2008 | |
| JP | 2008-284843 A | | 11/2008 | |
| JP | 2012-011642 A | | 1/2012 | |
| JP | 2014166692 A | * | 9/2014 | ......... B29C 45/1761 |
| JP | 2017-013348 A | | 1/2017 | |

OTHER PUBLICATIONS

International Search Report issued in International Patent Application No. PCT/JP2019/050936, dated Mar. 17, 2020, along with an English translation thereof.
Written Opinion of the International Searching Authority issued in International Application No. PCT/JP2019/050936, dated Mar. 17, 2020, along with an English translation thereof.
Extended European Search Report issued in European Patent Application No. 19906484.1 dated Aug. 25, 2022.

* cited by examiner

A-A

INJECTOR

TECHNICAL FIELD

The present disclosure relates to an injection device.

BACKGROUND ART

Conventionally, as injection devices used in injection molding machines or injection blow molding machines, an injection device has been known, which has a three-plate type frame including a front plate, a rear plate and an intermediate member (also referred to as an intermediate plate or a pusher plate). The frame has a structure in which the front plate and the rear plate are connected by tie bars or side support plates and the intermediate member is slidably supported therebetween. The front plate is provided with a heating cylinder (heating chamber), the rear plate is provided with a forward and backward moving mechanism for moving a screw forward and backward, and the intermediate member is provided with the screw, a driving mechanism for moving the screw, and the like (for example, see Patent Literature 1).

In a type where the intermediate member is guided by tie bars, movement of the intermediate member is adversely affected if sliding resistance between the intermediate member and the tie bars is increased due to influences such as poor parallelism and bending of the tie bars. For example, during an injection process, the tie bars are subjected to an injection pressure (injection force) via the front plate and the rear plate and thus are inevitably bent and deformed. When an amount of bending deformation is increased, the sliding resistance is also increased. Therefore, straight movability and parallelism of the intermediate member cannot be ensured, thereby making movement of the intermediate member unstable.

As a result, misalignment of the screw axially supported by the intermediate member may occur, or an extra load may be exerted on a driving mechanism such as a ball screw. Further, when the sliding resistance between the tie bars and the intermediate member is increased, detection accuracy of a pressure (back pressure) of a molten resin during a metering process also becomes poor. Therefore, it may not be possible to ensure stability in metering of the resin.

On the other hand, in a type where the intermediate member is guided by the side support plates, the intermediate member is movably supported by a guide member (e.g., a linear guide or the like) arranged on an upper surface of the side support plates. Due to such a configuration, rigidity of the frame is generally higher than that employing the tie bars, thereby making it easy to ensure straight movability or parallelism of the intermediate member. In addition, the sliding resistance can also be reduced.

CITATION LIST

Patent Literature

Patent Literature 1: JP 2017-013348 A

SUMMARY OF INVENTION

Technical Problem

However, even in the type where the intermediate member is guided by the side support plates, it is difficult to completely eliminate bending deformation of the side support plates caused by an injection pressure, and the bending deformation may cause movement of the intermediate member to become unstable.

The present disclosure has been made in view of such circumstances, and an object thereof is to provide an injection device capable of enhancing stability of movement of an intermediate member.

Solution to Problem

In order to solve the above object, one aspect of the present disclosure provides an injection device including a heating cylinder and a screw, the injection device including: a front plate to which the heating cylinder is fixed; a rear plate provided with a forward and backward moving mechanism that moves the screw forward and backward in an axial direction thereof; a pair of side support plates connecting the front plate and the rear plate at left and right end portions thereof; and an intermediate member slidably mounted on the side support plates, a rear end portion of the screw being axially supported by the intermediate member, wherein a guide member that guides the intermediate member to be slidably movable is provided on an upper surface of the side support plates, and a bending buffer portion is provided in a first region of the side support plates which is located more outward than a part of the side support plates on which the guide member is provided, the bending buffer portion being configured to be bent and deformed easier than a second region of the side support plates in which the guide member is provided.

Here, it is preferable that a thickness of the bending buffer portion is thinner than a thickness of the second region. Further, it is preferable that a recess is formed in at least an outer surface of the side support plates, so that the thickness of the bending buffer portion is thinner than the thickness of the second region. Further, it is preferable that the recess is provided continuously over a width direction of the side support plates.

Further, it is preferable that the bending buffer portion is provided in each of the first regions located outward of both sides of the second region.

Further, it is preferable that each of the side support plates includes: a body portion having a predetermined width; and a wide portion provided on a longitudinal end portion of the body portion and having a width wider than a width of the body portion, and the bending buffer portion is provided near a boundary between the body portion and the wide portion.

Advantageous Effects of Invention

According to the injection device of the present disclosure as described above, bending deformation of the side support plates is absorbed by a region located outward of a movable region of the intermediate member, thereby suppressing (reducing) the influence thereof on the movable region. Therefore, it is possible to enhance the stability of the movement of the intermediate member to which the screw is connected (axially supported).

DESCRIPTION OF EMBODIMENTS

Figure 1:
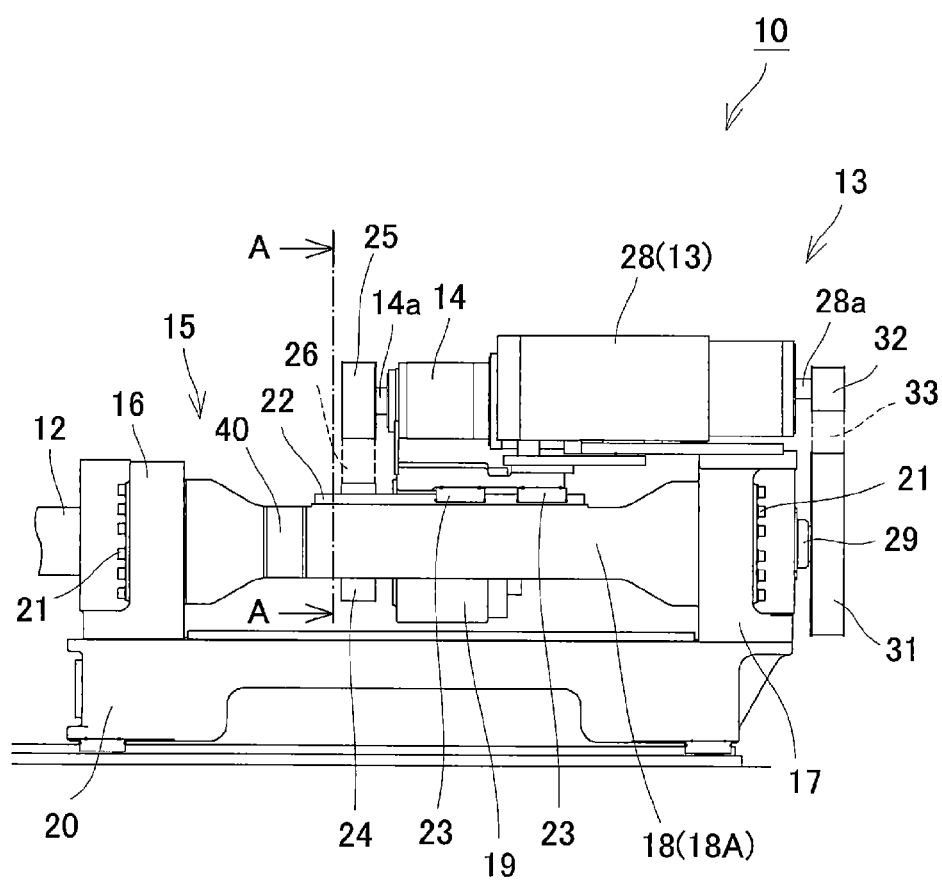
FIG. 1 is a front view showing an injection device according to an embodiment of the present disclosure.

Hereinafter, embodiments of the present disclosure will be described in detail with reference to the accompanying drawings.

An injection device of the present embodiment is used in an injection molding machine or an injection blow molding machine and is configured to be capable of injecting a resin material into an injection molding mold mounted on an injection mold clamping device (not shown).

As shown in FIGS. 1 to 5, the injection device 10 includes a heating cylinder (heating chamber) 12 having a screw 11 therein; a forward and backward moving device 13 that moves the screw 11 forward and backward in the heating cylinder 12; a rotating device 14 that rotates the screw 11; and a fixed frame 15 to which the heating cylinder 12, the forward and backward moving device 13 and the rotating device 14 are fixed.

The fixed frame 15 includes a front plate 16, a rear plate 17, side support plates 18 (18A, 18B), and an intermediate member (intermediate plate, pusher plate) 19. The fixed frame 15 is fixed on a base member 20. The front plate 16 and the rear plate 17 are connected by a pair of side support plates 18. The pair of side support plates 18 are provided between the front plate 16 and the rear plate 17 and connect left and right ends of the front plate 16 and the rear plate 17. In the present embodiment, each of the side support plates 18 has a front end surface fixed to the front plate 16 by a plurality of bolts 21 and a rear end surface fixed to the rear plate 17 by a plurality of bolts 21.

The intermediate member 19 is provided to be slidably movable within a predetermined range between the front plate 16 and the rear plate 17. In the present embodiment, a guide rail 22 as a guide member is provided on the side support plates 18, and a linear guide member 23 as a guide member relative to the guide rail 22 is provided on the intermediate member 19. The linear guide member 23 is slidably engaged with the guide rail 22, and the intermediate member 19 is slidably movable within a range, in which the guide rail 22 is provided.

Figure 2:
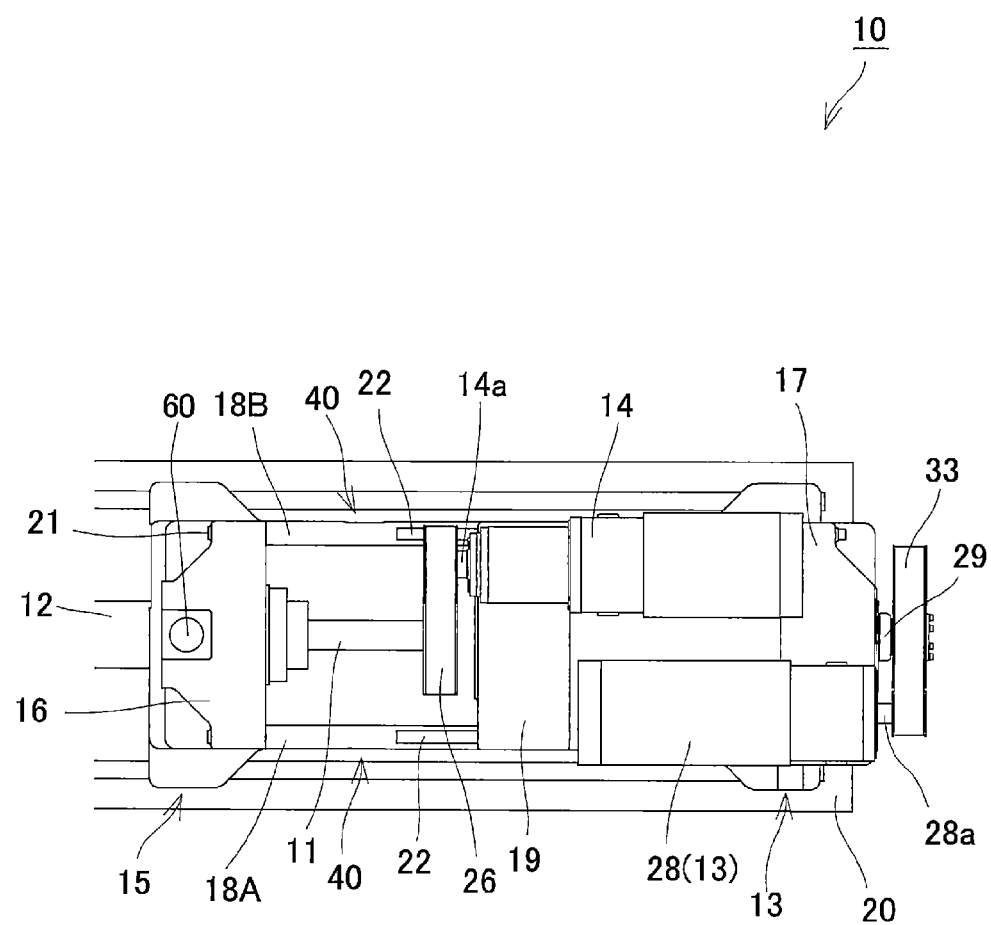
FIG. 2 is a plan view showing the injection device according to the embodiment of the present disclosure.

Further, on the front plate 16 constituting the fixed frame 15, a portion of the heating cylinder 12 near to a rear end thereof, which has the screw 11 therein, is fixed. As shown in FIG. 2, a portion of the screw 11 near to a rear end thereof extends outward of the heating cylinder 12, and an end portion of the screw 11 is rotatably and axially supported by the intermediate member 19. That is, the rear end portion of the screw 11 is connected to the intermediate member 19. As shown in FIG. 1, the rotating device 14 for rotating the screw 11 is fixed on an upper portion of the intermediate member 19. For example, the rotating device 14 is configured as an electric motor (servo motor) or the like. Further, the rotating device 14 is fixed on the upper portion of the intermediate member 19 via a fixing member (not shown).

Figure 3:
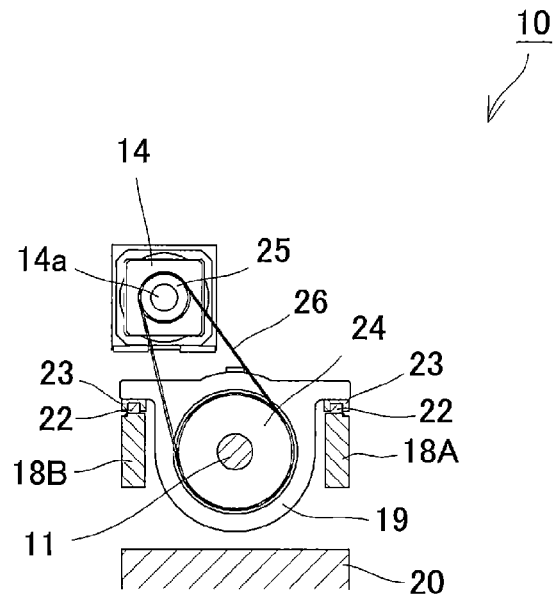
FIG. 3 is a left side view showing the injection device according to the embodiment of the present disclosure, illustrating a sectional view taken along a line A-A in FIG. 1.
Figure 5:
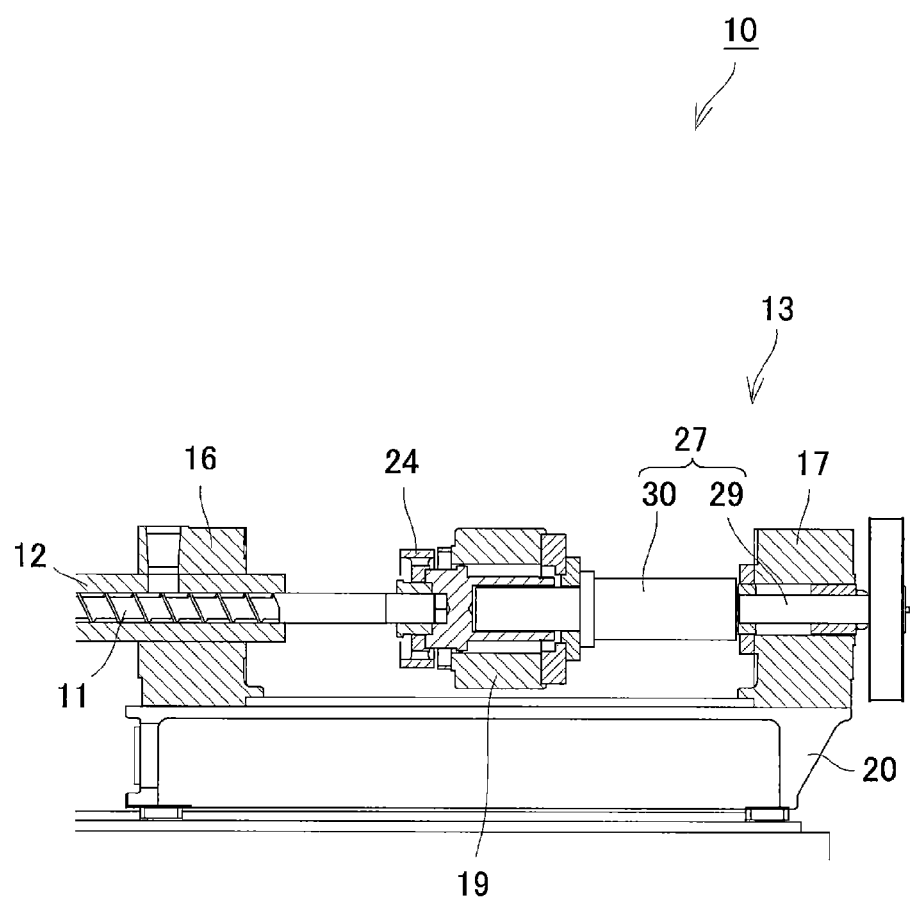
FIG. 5 is a sectional view showing the injection device according to the embodiment of the present disclosure.

As shown in FIG. 5, a first pulley 24 is provided near the rear end of the screw 11. As shown in FIG. 1, a second pulley 25 is provided on a rotating shaft 14a of the electric motor (rotating device) 14. As shown in FIG. 3, a first diameter of the first pulley 24 is larger than a second diameter of the second pulley 25. The screw 11 and the rotating device (electric motor) 14 are connected by a timing belt 26 wound around the first pulley 24 and the second pulley 25.

As shown in FIGS. 1 to 5, the forward and backward moving device 13 for moving the screw 11, which is supported by the intermediate member 19, forward or backward in an axial direction thereof is fixed on the rear plate 17. The forward and backward moving device 13 includes a forward and backward movement mechanism part 27 (see FIG. 5) and a forward and backward movement driving part 28 (see FIG. 1) that drives the forward and backward movement mechanism part 27. For example, the forward and backward movement mechanism part 27 is configured by a ball screw, and a portion of a ball screw shaft 29 near to a rear end thereof is rotatably supported by the rear plate 17.

As shown in FIG. 5, a portion of the ball screw shaft 29 near to a front end thereof is rotatably supported by the intermediate member 19. That is, a ball nut 30, through which the ball screw shaft 29 is screwed, is fixed to the intermediate member 19, and the ball screw shaft 29 is supported by the intermediate member 19 via the ball nut 30.

Figure 4:
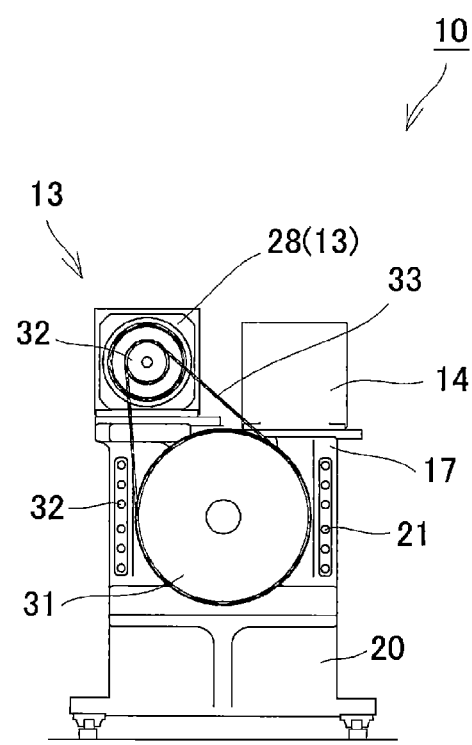
FIG. 4 is a right side view showing the injection device according to the embodiment of the present disclosure.

As shown in FIG. 1, the forward and backward movement driving part 28 is configured by an electric motor (servo motor) or the like and is fixed on an upper portion of the rear plate 17. As shown in FIGS. 1 and 5, the ball screw shaft 29 constituting the forward and backward movement mechanism part 27 (see FIG. 5) extends outward of the rear plate 17 (opposite side of the front plate 16), and a third pulley 31 (see FIG. 1) is provided near the end portion of the ball screw shaft 29. A fourth pulley 32 is provided on a rotating shaft 28a of the electric motor (forward and backward movement driving part) 28. As shown in FIG. 4, a third diameter of the third pulley 31 is larger than a fourth diameter of the fourth pulley 32. Further, the ball screw (forward and backward movement mechanism part) 27 (see FIG. 5) and the electric motor (forward and backward movement driving part) 28 are connected by a timing belt 33 wound around the third pulley 31 and the fourth pulley 32.

In the injection device 10 of the present embodiment as described above, the intermediate member 19 is moved (forward or backward) between the front plate 16 and the rear plate 17 by driving the forward and backward movement driving part (electric motor) 28 to rotate the ball screw shaft 29, which constitutes the forward and backward movement mechanism part 27, in a predetermined direction (for example, forward rotation or reverse rotation). Accordingly, the screw 11 is moved (forward or rearward) inside the heating cylinder 12. Further, the screw 11 is rotated in a predetermined direction (forward rotation or reverse rotation) inside the heating cylinder 12 by driving the rotating device (electric motor) 14.

Operation of the injection device 10 will be described below. First, a nozzle portion at a distal end of the heating cylinder 12 is brought into contact with a resin introduction port (sprue, gate) of a clamped mold. At this time, a solid plastic material (pellets) has already been filled in a raw material input port (hopper) 60 (see FIG. 2). Then, the rotating device 14 is actuated to rotate the screw 11 inside the heating cylinder 12. Further, the forward and backward moving device 13 is actuated to move the screw 11 backward inside the heating cylinder 12. The solid plastic material introduced into the heating cylinder 12 from the raw material input port 60 is melted and kneaded while being conveyed by rotation of the screw 11 inside the heating cylinder 12. As a result, a predetermined amount of molten resin is metered at the distal end of the heating cylinder 12. Then, the rotating device 14 is stopped and in this state the forward and backward moving device 13 is actuated to move the screw 11 forward inside the heating cylinder 12. As a result, the molten resin is injected into the mold.

In the injection device 10, the front plate 16 and the rear plate 17 constituting the fixed frame 15 may subject to a bending deformation due to a pressure (back pressure) during metering or a pressure (injection pressure) during injecting. Accordingly, the pair of side support plates 18 may also be subjected to bending deformation. In particular, bending deformation, which causes an inward side of the fixed frame 15 to become convex, is likely to occur on each side support plate 18. If the bending deformation occurs on each side support plate 18, sliding resistance between the intermediate member 19 and the guide rail (guide member) 22 may be increased and thus movement of the intermediate member 19 may become unstable. As a result, a pressure during metering or injecting may not be accurately detected and thus stable injection molding cannot be performed.

Therefore, according to the present disclosure, each side support plate 18 is provided with a bending buffer portion 40, thereby suppressing the bending deformation of the side support plates 18. Hereinafter, configuration of the side support plate 18 having the bending buffer portion 40 will be described in detail. Here, configurations of the side support plates 18A, 18B are similar to each other, and thus, the side support plate 18A will be described as an example.

Figure 6:
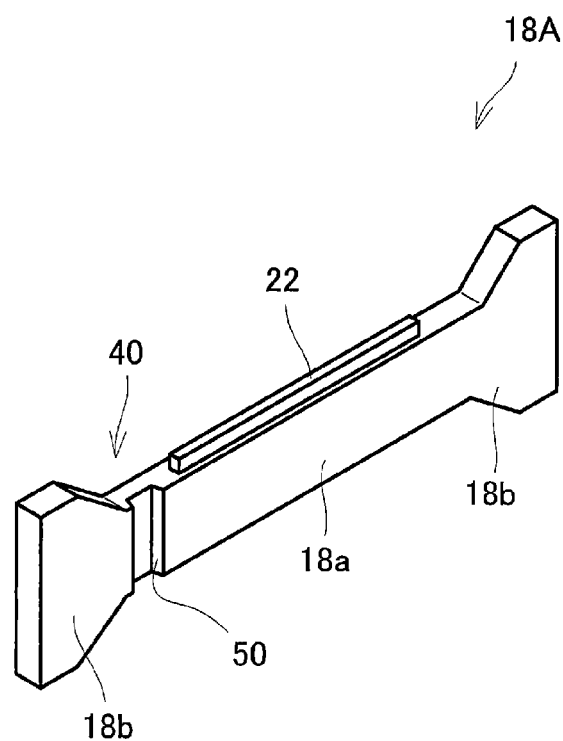
FIG. 6 is a perspective view showing a schematic structure of a side support plate according to the embodiment of the present disclosure.
Figure 7:
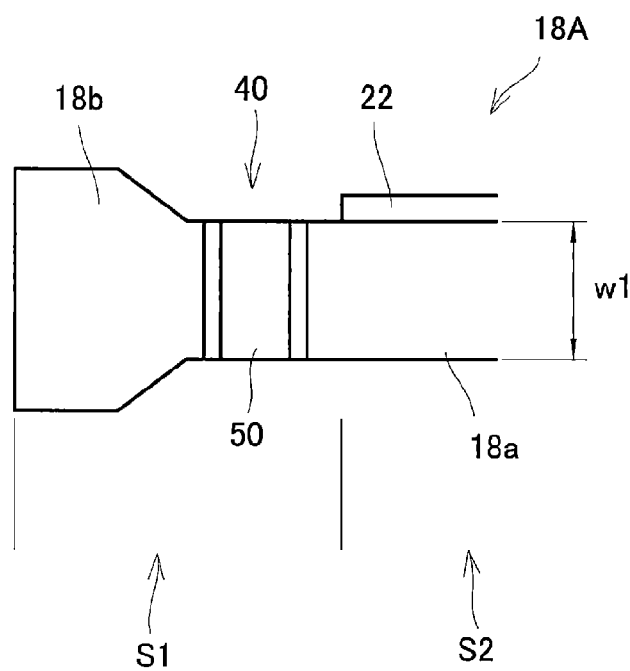
FIG. 7 is an enlarged view showing a bending buffer portion of the side support plate according to the embodiment of the present disclosure.
Figure 8:
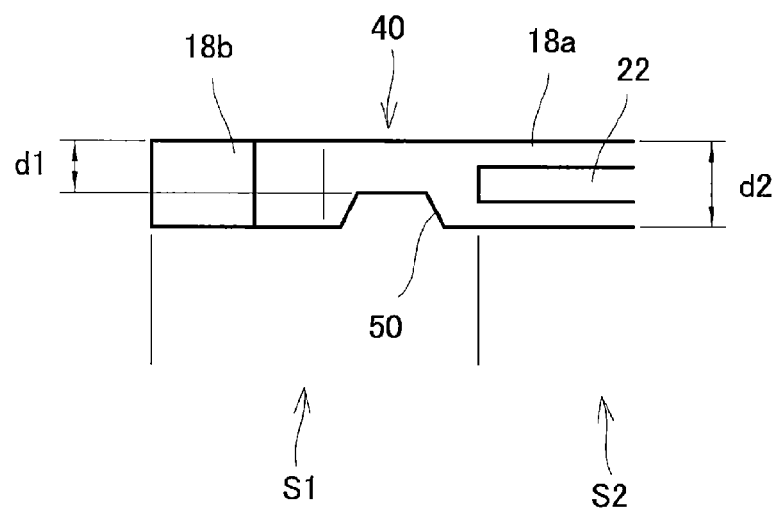
FIG. 8 is an enlarged view showing the bending buffer portion of the side support plate according to the embodiment of the present disclosure.

As shown in FIGS. 6 to 8, each of the pair of side support plates 18 (18A) constituting the fixed frame 15 includes a body portion 18a having a predetermined width w1 in a vertical direction, and wide portions 18b each provided on both longitudinal end portions of the body portion 18a and having a width wider than the body portion 18a. The guide rail (guide member) 22 for guiding sliding movement of the intermediate member 19 as described above is provided on an upper surface of the body portion 18a of each side support plate 18.

Further, the bending buffer portion 40 which can be bent and deformed easier than a longitudinal center portion of the side support plate 18 is provided near an end portion (longitudinal end portion) of the side support plate 18. In the present embodiment, the bending buffer portion 40 is provided near the front end portion of the body portion 18a of the side support plate 18 as shown in FIGS. 7 and 8. Specifically, the bending buffer portion 40 is provided in a region (first region S1) of the side support plates 18 which is located more outward than a part of the side support plates 18 on which the guide rail 22 is provided.

Therefore, the bending buffer portion 40 is configured to be bent and deformed easier than a region (second region S2) of the side support plate 18 in which the guide rail 22 is provided. In other words, the bending buffer portion 40 has rigidity relatively lower than the second region S2 of the side support plate 18. Hear the first region S1 may also be referred to as a region of the side support plates 18 in which a movable range of the intermediate member 19 is not included, and the second region S2 may also be referred to as a region of the side support plates 18 in which the movable range of the intermediate member 19 is included.

Here, although it is sufficient if the bending buffer portion 40 is provided in the region (first region S1) of the side support plates 18 which is located more outward than the part of the side support plates 18 on which the guide rail 22 is provided, it is preferable that the bending buffer portion 40 is provided in the body portion 18a. That is, it is preferable that the bending buffer portion 40 is provided in a part of the body portion 18a corresponding to the first region S1. Further, it is preferable that the bending buffer portion 40 is provided in the first region S1 of the body portion 18a, particularly near a boundary between the body portion 18a and the wide portion 18b.

As shown in FIG. 8, in the present embodiment, a horizontal thickness d1 of the bending buffer portion 40 is thinner than a thickness of the second region S2 of the body portion 18a. That is, the horizontal thickness d1 of the bending buffer portion 40 is thinner than the horizontal thickness d2 of the body portion 18a in the second region S2. Specifically, a recess 50 is provided in a side surface of a region of the side support plate 18 in which the guide rail 22 is not provided, thereby forming the bending buffer portion 40 having the thickness d1 (<d2). Here, the thickness d1 of the side support plate 18 and a depth of the recess 50 which constitute the bending buffer portion 40 are not particularly limited, and may be appropriately set depending on a degree of bending deformation of the side support plate 18.

Further, the recess 50 is provided continuously over a width direction (vertical direction, upward and downward direction in FIG. 7) of the side support plate 18. Alternatively, the recess 50 may be provided intermittently along the width direction of the side support plate 18. The configuration of the bending buffer portion 40 is not particularly limited if it can be bent and deformed easier than the second region S2 of the side support plate 18, and it is sufficient if the rigidity of the entire bending buffer portion 40 is lower than that of the second region S2 of the side support plate 18.

In the present embodiment, the bending buffer portion 40 is formed by providing the recess 50 in the side surface of the side support plate 18 facing outward in the horizontal direction (side surface on an opposite side of the intermediate member 19). Alternatively, the recess 50 may be provided in an inward side surface of the side support plate 18 or in both side surfaces thereof. That is, it is sufficient if the recess 50 is provided in at least one of the side surfaces of the side support plate 18.

By providing the bending buffer portion 40 in the side support plate 18, bending deformation of the side support plate 18 caused by an injection pressure can be suppressed. That is, since the bending buffer portion 40 is bent and deformed, it is possible to suppress bending deformation of the other portions of the side support plate 18 (in particular, the second region S2 of the body portion 18a in which the guide rail 22 is provided).

Further, since the bending buffer portion 40 is formed by providing the recess 50 in the outer surface of the side support plate 18, the bending buffer portion 40 is apt to allow bending deformation inward of the fixed frame 15.

Accordingly, it is possible to suppress or limit a change in distance between the pair of side support plates 18, thereby reducing the sliding resistance when the intermediate member 19 moves. Therefore, it becomes easy to ensure straight movability and parallelism of the intermediate member 19 which is slidably supported on the side support plates 18, thereby enhancing stability of movement of the intermediate member 19. Further, detection accuracy of a pressure (back pressure) of the molten resin during a metering process is also enhanced, thereby ensuring stability in metering of the resin.

Figure 9:
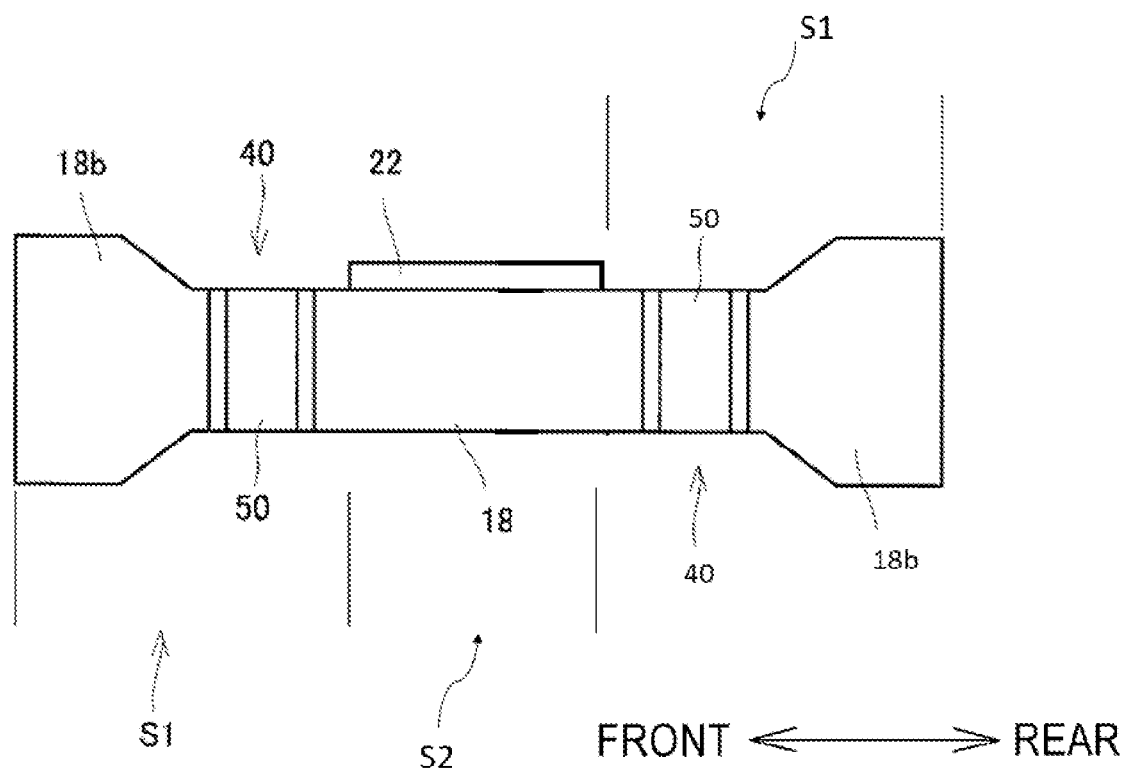
FIG. 9 is an enlarged view showing a bending buffer portion of the side support plate according to an embodiment of the present disclosure.

In the present embodiment, the configuration in which the bending buffer portion 40 is provided only on the front side of the side support plates 18 is illustrated. However, the bending buffer portion 40 may be provided only on the rear side of the side support plates 18, and preferably, as illustrated in, for example, FIG. 9, the bending buffer portion 40 is provided on each of the front and rear sides of the side support plates 18. That is, it is preferable that the bending buffer portion 40 is provided in each of the first regions S1 of the side support plates 18 which are located outward of both sides of the second region S2. As a result, it is possible to further suppress bending deformation of the side support plates 18 caused by an injection pressure.

Further, in the present embodiment, the wide portions 18b having a width wider than the body portion 18a are provided on both longitudinal end portions of the side support plates 18, and the side support plates 18 are fixed to the front plate 16 and the back plate 17 by the wide portions 18b. Therefore, it is possible to ensure a relatively large contact area between the side support plates 18 and the front plate 16 and the back plate 17, thereby ensuring that the side support plates 18 are firmly connected to the front plate 16 and the back plate 17.

Here, the wide portion 18b may not necessarily be provided if connection strength of the side support plates 18 to the front plate 16 and the rear plate 17 can be ensured.

Although the embodiments of the present invention have been described above, the present disclosure is not limited to the embodiments as described above. The present disclosure can be appropriately modified within a scope which does not depart from the spirit thereof.

For example, in the above-described embodiments, although the bending buffer portion 40 is provided in a part of the first region S1 of the side support plates 18, the bending buffer portion 40 may be provided in the entire first region S1. Further, although it is preferable that the bending buffer portion 40 is provided in the first region S1, the bending buffer portion 40 may not necessarily be provided in the body portion 18a, and may be provided in the wide portion 18b.

Further, in the above-described embodiments, although the bending buffer portion 40 is provided near one of the longitudinal end portions of the body portion 18a of the side support plates 18 (on the side close to the front plate 16), the bending buffer portion 40 may be provided near the other longitudinal end portion of the body portion 18a (on the side close to the rear plate 17). Of course, the bending buffer portion 40 may be provided near both longitudinal end portions of the body portion 18a of the side support plates 18.

Further, in the above-described embodiments, although the fixed frame 15 is illustrated as a structure in which the side support plates 18 are fixed to the front plate 16 and the rear plate 17 by the bolts 21, the fixed frame 15 is not limited to such structure. The fixed frame 15 may be configured such that the front plate 16, the rear plate 17 and the side support plate 18 are integrally formed.

In the case of this configuration, it is preferable that the bending buffer portion 40 is provided as near a boundary between the side support plates 18 and the front plate 16 or the rear plate 17 as possible. By doing so, it is possible to more reliably suppress bending deformation of the side support plates 18 caused by an injection pressure.

This application is based on Japanese Patent Application No. 2018-245947 filed on Dec. 27, 2018, the contents of which are incorporated herein by reference.

The invention claimed is:

1. An injection device including a heating cylinder and a screw, the injection device comprising:
   a front plate to which the heating cylinder is fixed;
   a rear plate provided with a forward and backward movement mechanism that moves the screw forward and backward in an axial direction thereof;
   a pair of side support plates connecting the front plate and the rear plate at left and right end portions thereof, and
   an intermediate member slidably mounted on the side support plates, a rear end portion of the screw being axially supported by the intermediate member,
   wherein a guide member that guides the intermediate member to be slidably movable is provided on an upper surface of each of the side support plates, and a bending buffer portion is provided in a first region of each of the side support plates which is located more outward than a part of each of the side support plates on which the guide member is provided, the bending buffer portion being configured to be bent and deformed easier than a second region of each of the side support plates in which the guide member is provided,
   wherein each of the side support plates includes the first region provided on a front portion of each of the side support plates, which is located at a more distal portion than the part of the side support plates on which the guide member is provided in a longitudinal direction, and an other first region provided on a rear portion of each of the side support plates, opposite of the front portion of each of the side support plates in the longitudinal direction and also located at a more distal portion than the part of the side support plates on which the guide member is provided,
   wherein the bending buffer portion is provided in both the first region and the other first region,
   wherein a forward and backward movement driver is configured to drive the forward and backward movement mechanism,
   wherein the forward and backward movement driver is fixed to an upper portion of the rear plate entirely above one of the side support plates, and adjacent to a rotation device configured to rotate the screw, and the forward and backward movement driver is configured to engage with the forward and backward moving mechanism via a timing belt wound around pullies positioned at a rear end of the injection device,
   wherein the bending buffer portion includes a recess formed in only an outer surface of each of the side support plates, so that the thickness of the bending buffer portion is thinner than the thickness of the second region, and
   wherein the recess is provided at a constant thickness continuously over an entirety of a width direction of each of the side support plates.

2. The injection device according to claim 1,
   wherein each of the side support plates includes: a body portion having a predetermined width; and a wide portion provided on a longitudinal end portion of the body portion and having a width wider than a width of the body portion, and wherein the bending buffer portion is provided near a boundary between the body portion and the wide portion.

\* \* \* \* \*